(12) United States Patent
Shinada

(10) Patent No.: US 6,456,315 B1
(45) Date of Patent: Sep. 24, 2002

(54) INTERNAL-SURFACE-SCANNING IMAGE RECORDING APPARATUS

(75) Inventor: Hidetoshi Shinada, Hertfordshire (GB)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/566,083

(22) Filed: May 9, 2000

(30) Foreign Application Priority Data

May 20, 1999  (JP) .......................................... 11-140846

(51) Int. Cl.⁷ ................................................ B41J 27/00
(52) U.S. Cl. ........................................ 347/256; 347/241
(58) Field of Search ................................ 347/241, 256; 359/17, 211, 257, 258, 303, 487, 490, 495, 212

(56) References Cited

U.S. PATENT DOCUMENTS

| | | | | |
|---|---|---|---|---|
| 5,011,245 A | * | 4/1991 | Gibbs | 359/212 |
| 5,420,714 A | * | 5/1995 | Zelenka | 359/211 |
| 5,481,384 A | * | 1/1996 | Kramer et al. | 359/17 |
| 5,701,201 A | * | 12/1997 | Okazaki | 359/487 |

FOREIGN PATENT DOCUMENTS

| | | | | |
|---|---|---|---|---|
| DE | 195 32 971 A1 | 3/1997 | ........... | G02B/26/10 |
| GB | 2 313 975 A | 12/1997 | ............ | H04N/1/06 |

\* cited by examiner

*Primary Examiner*—Hai Pham
(74) *Attorney, Agent, or Firm*—Sughrue Mion, PLLC

(57) ABSTRACT

A laser beam emitted from a laser beam generator is modulated by a laser beam modulator depending on an image to be recorded, and then converted into a linearly polarized light beam having a predetermined direction of polarization by a polarization switcher. The linearly polarized light beam is then converted into a circularly polarized light beam by a quarter-wave plate. The circularly polarized light beam is converted by a quarter-wave plate of a rotatable unit into a linearly polarized light beam, which is applied to a polarization beam splitter. If the linearly polarized light beam is an s-polarized light beam, then the laser beam is reflected by the polarization beam splitter toward a recording medium. If the linearly polarized light beam is a p-polarized light beam, then the laser beam passes through the polarization beam splitter. The laser beam passes through a quarter-wave plate and is reflected by a convex mirror and then by the polarization beam splitter toward the recording medium. The laser beam is thus applied substantially in its entirety to the recording medium for thereby recording a two-dimensional image efficiently on the recording medium.

10 Claims, 18 Drawing Sheets

INTERNAL-SURFACE-SCANNING IMAGE RECORDING APPARATUS

BACKGROUND OF THE INVENTION

1. Field of the Invention:

The present invention relates to an internal-surface-scanning image recording apparatus for efficiently recording an image on a recording medium.

2. Description of the Related Art

One type of image recording apparatus for recording an image on a sheet-like recording medium with a laser beam is known as an internal-surface-scanning image recording apparatus. The internal-surface-scanning image recording apparatus has a hollow cylindrical drum with a sheet-like recording medium attached to an inner circumferential surface thereof, and an optical system disposed coaxially in the drum for guiding a laser beam to the recording medium.

Specifically, as shown in FIG. 18 of the accompanying drawings, a spinner 4 disposed coaxially in a hollow cylindrical drum 6 has a reflecting surface inclined at 45° to the optical axis of a laser beam L which is emitted from a laser beam source 2 positioned outside of the drum 6. When the spinner 4 is rotated about its own axis at a high speed and axially displaced along the central axis of the drum 6, the reflecting surface of the spinner 4 reflects the laser beam L to a recording medium F attached to an inner circumferential surface of the drum 6 to record a two-dimensional image on the recording medium F.

Since the recording medium F is attached to the inner circumferential surface of the drum 6, the recording medium F is prevented from being accidentally peeled off the drum 6 while the image is being recorded on the recording medium F, and the image can be recorded on the recording medium F with high dimensional accuracy.

The drum 6 has a slot 8 defined partly therein for allowing the recording medium F to be attached therethrough to the inner circumferential surface of the drum 6. Since no image is recorded while the laser beam L reflected by the reflecting surface of the spinner 4 traverses the slot 8, the internal-surface-scanning image recording apparatus shown in FIG. 18 suffers a waste of time and laser beam energy while in operation. As a result, the internal-surface-scanning image recording apparatus shown in FIG. 18 records an image on the recording medium F with relatively low efficiency.

SUMMARY OF THE INVENTION

It is a general object of the present invention to provide an internal-surface-scanning image recording apparatus which is capable of recording an image efficiently on a recording medium.

A major object of the present invention is to provide an internal-surface-scanning image recording apparatus which is capable of effectively utilizing a light beam for recording an image on a recording medium.

Another object of the present invention is to provide an internal-surface-scanning image recording apparatus which is capable of shortening a period of time to record an image on a recording medium.

Yet another object of the present invention is to provide an internal-surface-scanning image recording apparatus which is of a relatively simple construction for recording an image efficiently on a recording medium.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
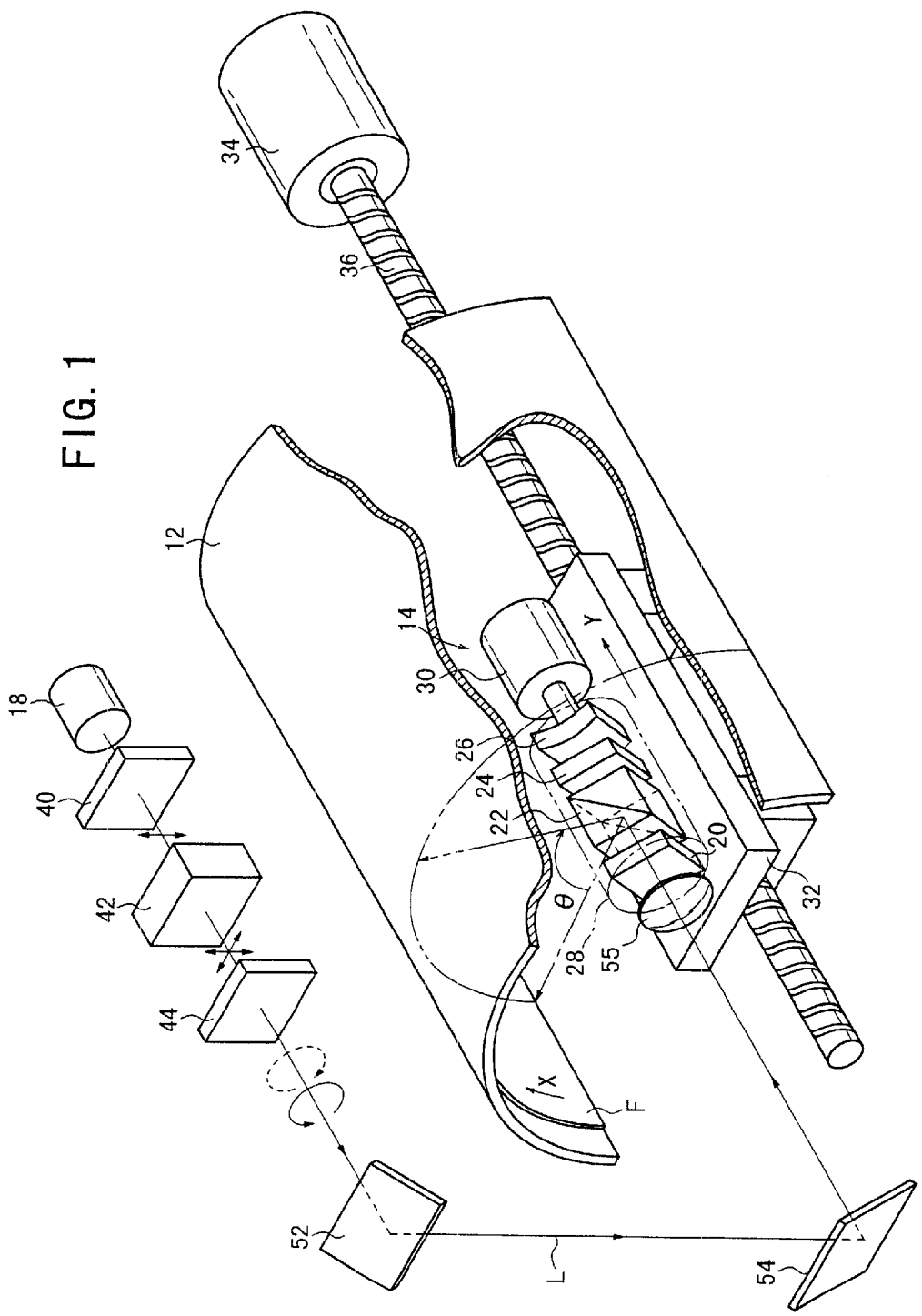
FIG. 1 is a fragmentary perspective view of an internal-surface-scanning image recording apparatus according to an embodiment of the present invention.

Like or corresponding parts are denoted by like or corresponding reference characters throughout views.

Figure 2:
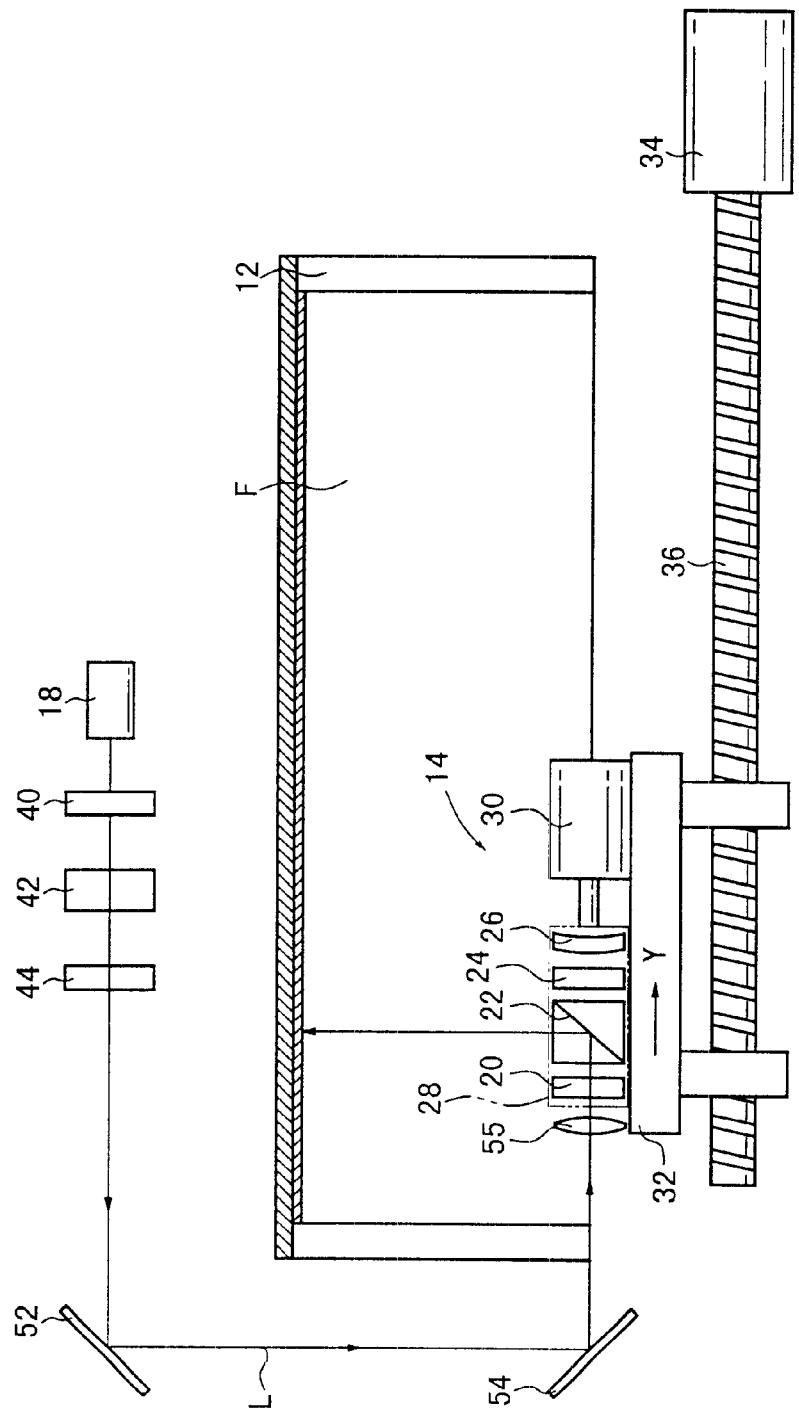
FIG. 2 is a sectional side elevational view of the internal-surface-scanning image recording apparatus shown in FIG. 1.

FIGS. 1 and 2 show an internal-surface-scanning image recording apparatus 10 according to an embodiment of the present invention. As shown in FIGS. 1 and 2, the internal-surface-scanning image recording apparatus 10 has a hollow semicylindrical drum 12, i.e., a cylindrical drum with a slot defined therein in an angular extent of 180° about the central axis thereof, with a sheet-like recording medium F for recording an image thereon being attached to an inner circumferential surface of the drum 12.

The internal-surface-scanning image recording apparatus 10 also has a spinner 14 disposed coaxially in the drum 12. The spinner 14 serves to reflect a laser beam L emitted from a laser beam generator 18 to scan the recording medium F with the reflected laser beam L in a main scanning direction indicated by the arrow X. The spinner 14 has a rotatable unit 28 comprising a quarter-wave plate 20, a polarization beam splitter 22, a quarter-wave plate 24, and a convex mirror 26 which are successively arranged in the order named with respect to the direction in which the laser beam L is applied to the spinner 14. The rotatable unit 28 can be rotated by a motor 30. The polarization beam splitter 22 has a polarizing film for passing a p-polarized laser beam L substantially in its entirety and reflecting an s-polarized laser beam L substantially in its entirety. The convex mirror 26 has its focal length selected to focus the reflected laser beam L onto the recording medium F via the quarter-wave plate 24 and the polarization beam splitter 22.

The motor 30 is mounted on a movable base 32 threaded over a ball screw 36 extending parallel to the central axis of the drum 12 and having an end coupled coaxially to an electric motor 34. When the electric motor 34 is energized, therefore, the ball screw 36 is rotated about its own axis, axially displacing the spinner 14 along the central axis of the drum 12, i.e., in an auxiliary canning direction Y which is perpendicular to the main scanning direction.

A laser beam modulator 40 is positioned to receive the laser beam L emitted by the laser beam generator 18. The laser beam L applied to the laser beam modulator 40 is modulated thereby depending on an image to be recorded on the recording medium F. The laser beam modulator 40 comprises an acousto-optic modulator (AOM), for example.

Downstream of the laser beam modulator 40 with respect to the direction of the laser beam L modulated by the laser beam modulator 40, there are successively disposed a polarization switcher 42, which comprises an electro-optic deflector (EOD), a Faraday-effect device, or the like, for converting a p-polarization laser beam L into an s-polarized laser beam L, and a quarter-wave plate 44 for converting a linearly polarized laser beam L that has passed through the polarization switcher 42 into a circularly polarized laser beam L. Reflecting mirrors 52, 54 and a condensing lens 55 are disposed in the path of the laser beam L which extends from the quarter-wave plate 44 to the spinner 14. The condensing lens 55 has its focal length selected to focus the laser beam L onto the recording medium F via the polarization beam splitter 22.

Figure 3:
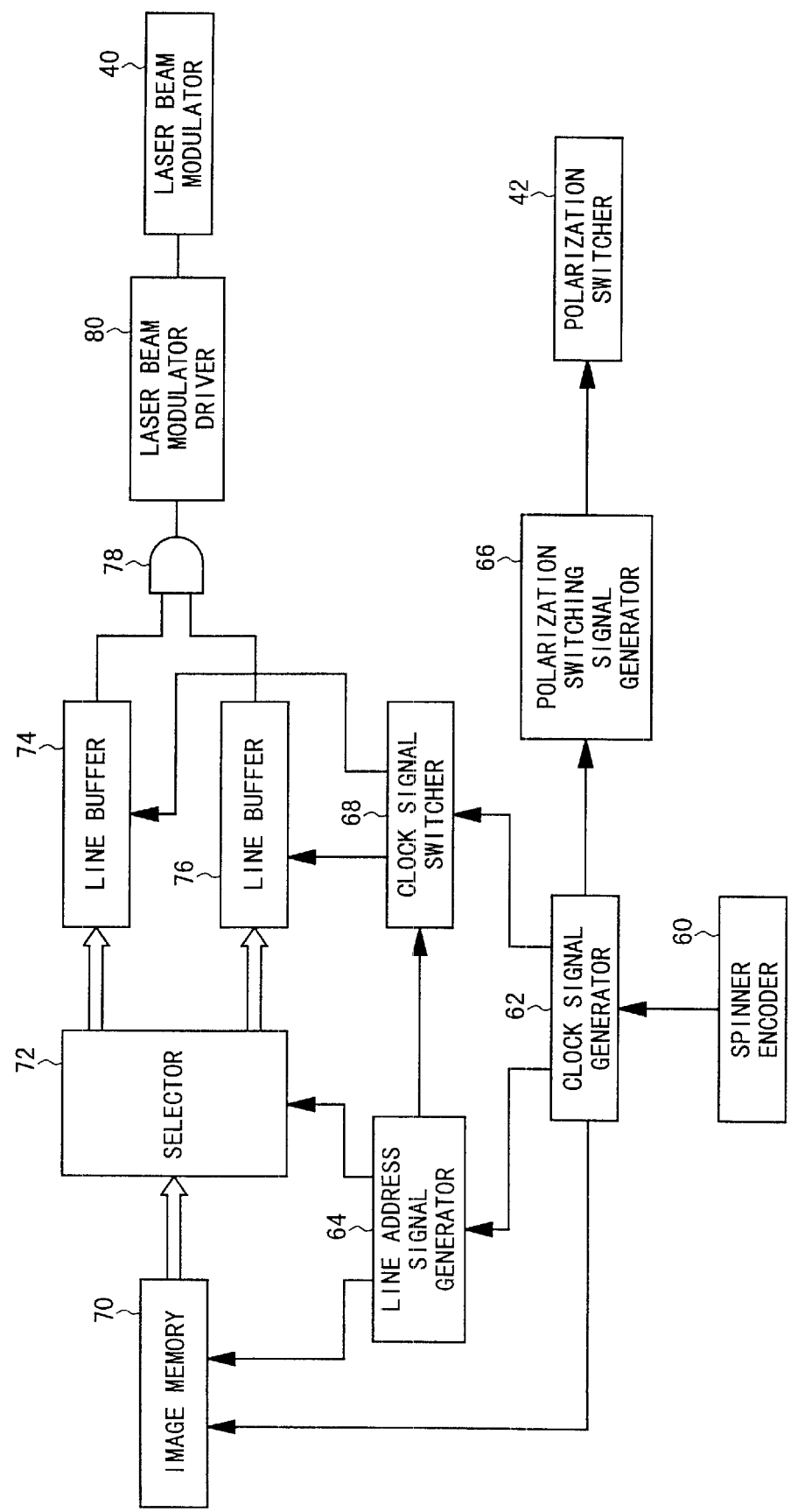
FIG. 3 is a block diagram of a control system for the internal-surface-scanning image recording apparatus shown in FIG. 1.

FIG. 3 shows in block form a control system for the internal-surface-scanning image recording apparatus shown in FIGS. 1 and 2.

As shown in FIG. 3, the control system includes a spinner encoder 60 which generates a pulse signal representative of the angular position of the polarization beam splitter 22. The pulse signal generated by the spinner encoder 60 is supplied to a clock signal generator 62 which generates a clock signal corresponding to pixels to be recorded on the recording medium F. The generated clock signal is supplied to a line address signal generator 64, a polarization switching signal generator 66, a clock signal switcher 68, and an image memory 70.

The image memory 70 stores image data to be recorded on the recording medium F. The line address signal generator 64 generates a line address signal for reading one line of image data in the main scanning direction X at a time from the image memory 70, based on the clock signal supplied from the clock signal generator 62.

Line buffers 74, 76 are connected to the image memory 70 via a selector 72. The selector 72 alternately selects the line buffers 74, 76, each storing one line of image data read from the image memory 70, according to the output 25 timing of a line address signal from the line address signal generator 64. The clock signal switcher 68 supplies the clock signal from the clock signal generator 62 selectively to the line buffers 74, 76 according to the output timing of the line address signal from the line address signal generator 64.

A laser beam modulator driver 80 is connected to the line buffers 74, 76 via an AND gate 78. The laser beam modulator driver 80 energizes the laser beam modulator 40 based on the image data supplied from one of the line buffers 74, 76 at a time.

Based on the clock signal from the clock signal generator 62, the polarization switching signal generator 66 generates a polarization switching signal for switching a plane of polarization of the laser beam each time the rotatable unit 28 is angularly moved 180°, and supplies the generated polarization switching signal to the polarization switcher 42.

Figure 5:
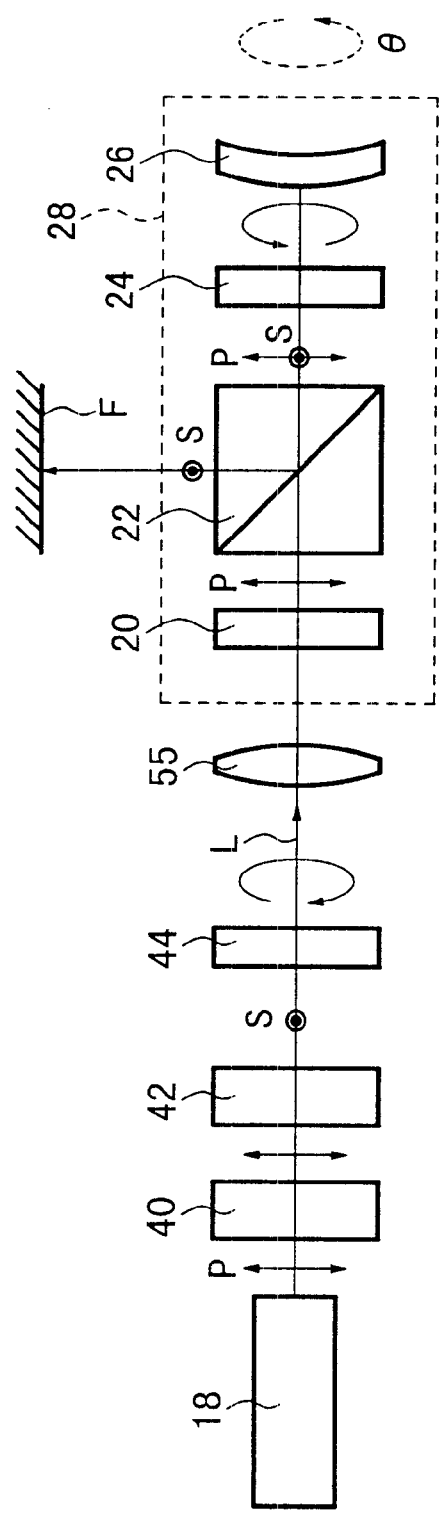
FIG. 5 is a schematic view showing the manner in which the internal-surface-scanning image recording apparatus shown in FIG. 1 operates to record an image.
Figure 6:
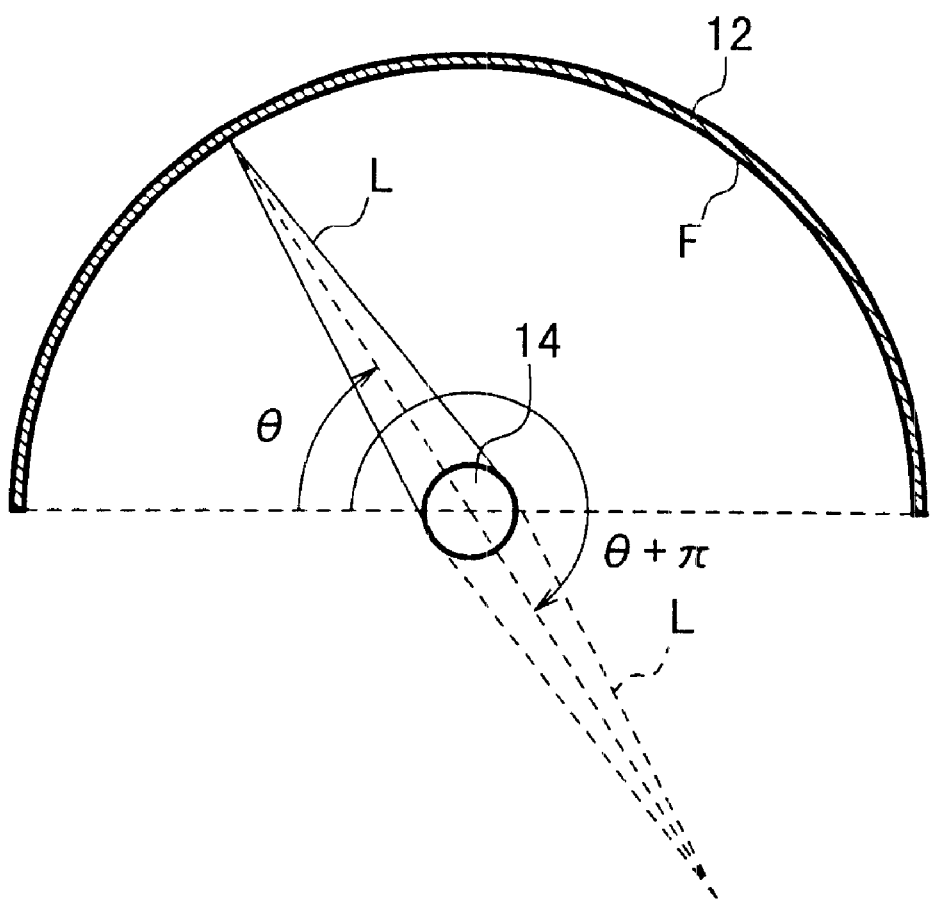
FIG. 6 is a cross-sectional view showing the manner in which the internal-surface-scanning image recording apparatus shown in FIG. 1 operates.

Operation of the internal-surface-scanning image recording apparatus 10 will be described below with reference to FIGS. 4 through 6.

It is assumed that the laser beam L emitted from the laser beam generator 18 is p-polarized. If, however, the laser beam generator 18 generates a non-polarized laser beam or a polarized laser beam other than a p-polarized laser beam, then a polarizer or rotator may be disposed between the laser beam generator 18 and the polarization switcher 42 for easily producing a p-polarized laser beam L.

Prior to starting to record a desired image on the recording medium F, the polarization switcher 42 is arranged to pass a p-polarized laser beam L as it is therethrough. The polarization beam splitter 22 of the spinner 14 is oriented in a direction to guide the laser beam L to an end of the recording medium F attached the drum 12 (see FIG. 4).

Then, the motor 30 is energized to rotate the rotatable unit 28 in a direction indicated by θ in FIG. 1, starting to record an image on the recording medium F with the laser beam L which is modulated depending on the image by the laser beam modulator 40.

When the spinner 14 starts rotating, the spinner encoder 60 coupled thereto generates and supplies a pulse signal to the clock signal generator 62, which generates a clock signal. The generated clock signal is supplied to the line address signal generator 64, the polarization switching signal generator 66, the clock signal switcher 68, and the image memory 70.

The line address signal generator 64 which is supplied with the clock signal from the clock signal generator 62 generates line address signals, and outputs the generated line address signals to the image memory 70. One line of image data in the main scanning direction X which is based on an address represented by a line address signal is read from the image memory 70 according to the clock signal, and supplied to the selector 72.

The selector 72 stores the line of image data read from the image memory 70 into the line buffer 74 which is selected. The line of image data stored in the line buffer 74 is supplied to the laser beam modulator driver 80 via the AND gate 78. The laser beam modulator driver 80 then energizes the laser beam modulator 40 according to the supplied image data.

The p-polarized laser beam L emitted from the laser beam generator 18 is turned on and off, i.e., modulated, by the laser beam modulator 40 which is energized according to the supplied image data, and then applied through the polarization switcher 42 as the p-polarized laser beam L to the quarter-wave plate 44. The quarter-wave plate 44 converts the p-polarized laser beam L into a circularly polarized laser beam L, which is applied via the condensing lens 55 to the quarter-wave plate 20 of the rotatable unit 28 of the spinner 14. The quarter-wave plate 20 converts the circularly polarized laser beam L into an s-polarized laser beam L, which is applied to the polarization beam splitter 22. At this time, the polarization beam splitter 22 reflects the s-polarized laser beam L substantially in its entirety toward the recording medium F. Therefore, while the polarization beam splitter 22 is being angularly moved from 0° to 180°, one scanning line of image is recorded on the recording medium by the laser beam L reflected by the polarization beam splitter 22 (see FIG. 6).

While the image data stored in the line buffer 74 is being read and the line of image corresponding to the stored image data is being recorded on the recording medium F, the line address signal generator 64 supplies a generated line address signal corresponding to the next scanning line to the image memory 70. One line of image data based on an address represented by the line address signal corresponding to the next scanning line number is now read from the image memory 70, and supplied via the selector 72 to the line buffer 76.

When the spinner 14 rotates 180°, the clock signal switcher 68 supplies the clock signal from the clock signal generator 62 to the line buffer 76 according to the line address signal from the line address signal generator 64. The line of image data stored in the line buffer 76 is read and supplied to the laser beam modulator driver 80 via the AND gate 78.

The polarization switching signal generator 66 counts a predetermined number of clock pulses of the clock signal from the clock signal generator 62 thereby to generate a polarization switching signal, and supplies the generated polarization switching signal to the polarization switcher 42. In response to the polarization switching signal, the polarization switcher 42 converts the p-polarization laser beam L into an s-polarized laser beam L (see FIG. 5).

Figure 4:
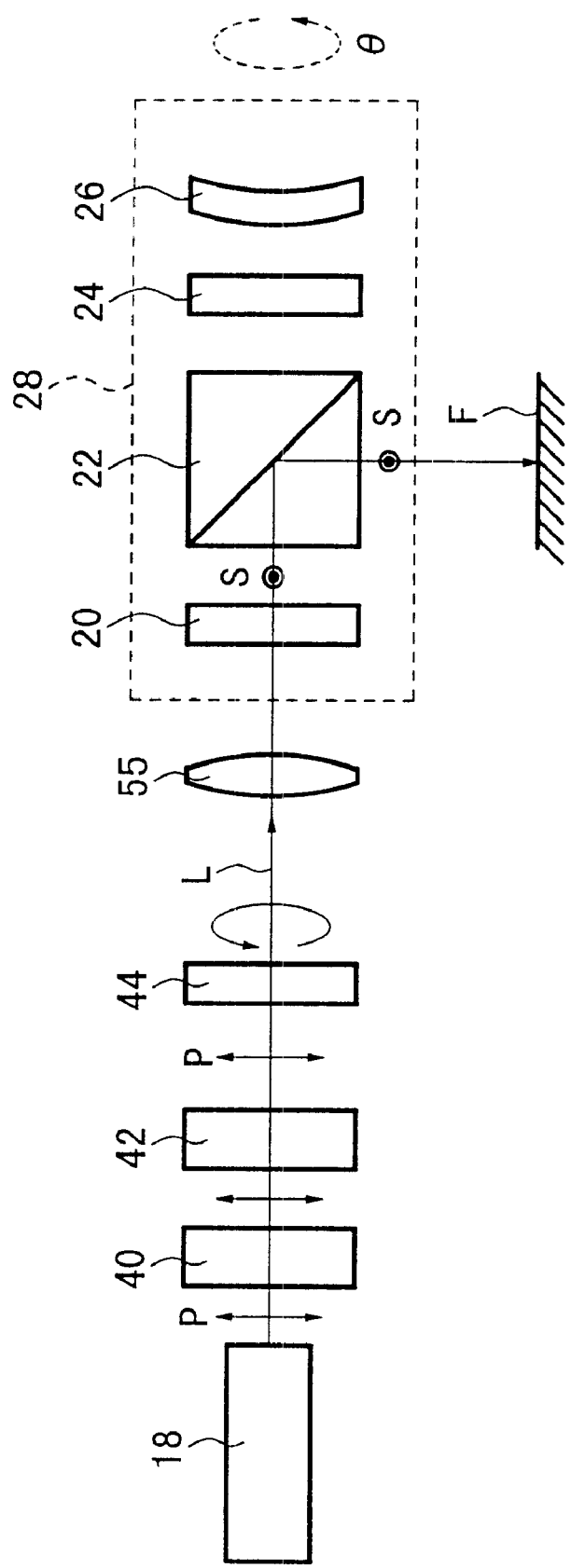
FIG. 4 is a schematic view showing the manner in which the internal-surface-scanning image recording apparatus shown in FIG. 1 operates to record an image.

The s-polarized laser beam L produced by the polarization switcher 42 is converted by the quarter-wave plate 44 into a circularly polarized laser beam L which rotates in a direction opposite to the circularly polarized laser beam L shown in FIG. 4. The circularly polarized laser beam L is applied via the condensing lens 55 to the quarter-wave plate 20 of the rotatable unit 28 of the spinner 14. The quarter-wave plate 20 converts the circularly polarized laser beam L into a p-polarized laser beam L, which is applied to the polarization beam splitter 22. At this time, the polarization beam splitter 22 passes the p-polarized laser beam L substantially in its entirety toward the convex mirror 26 via the quarter-wave plate 24. The p-polarized laser beam L that has passed through the quarter-wave plate 24 is converted into a circularly polarized laser beam L, which is thereafter reflected by the convex mirror 26 back toward the quarter-wave plate 24. The quarter-wave plate 24 converts the circularly polarized laser beam L into an s-polarized laser beam L. The s-polarized laser beam L is reflected substantially in its entirety by the polarization beam splitter 22, and applied to the recording medium F. Therefore, while the polarization beam splitter 22 is being angularly moved from 180° to 360°, one scanning line of image is recorded on the recording medium by the laser beam L reflected by the polarization beam splitter 22 (see FIG. 6).

Figure 7:
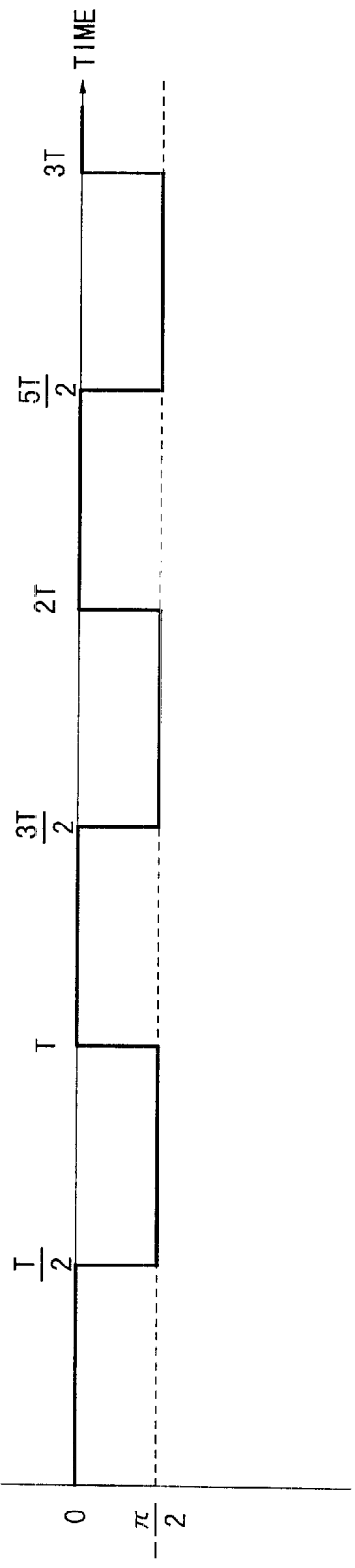
FIG. 7 is a diagram illustrative of the angular displacement of a plane of polarization by a polarization switcher in the internal-surface-scanning image recording apparatus shown in FIG. 1.

FIG. 7 shows the relationship between rotational periods T of the spinner 14, each corresponding to one rotation (360°) of the spinner 14, and the angular displacement of the plane of polarization of the laser beam L by the polarization switcher 42. As shown in FIG. 7, each time the spinner 14 is angularly moved 180°, the plane of polarization of the laser beam L is changed $2\pi$. Such a cycle is repeated to record a two-dimensional image on the recording medium F with the laser beam L. Inasmuch as the laser beam L applied to the spinner 14 is supplied substantially in its entirety to the recording medium F, the desired image is recorded efficiently on the recording medium F without an undue waste of laser beam energy.

Figure 8:
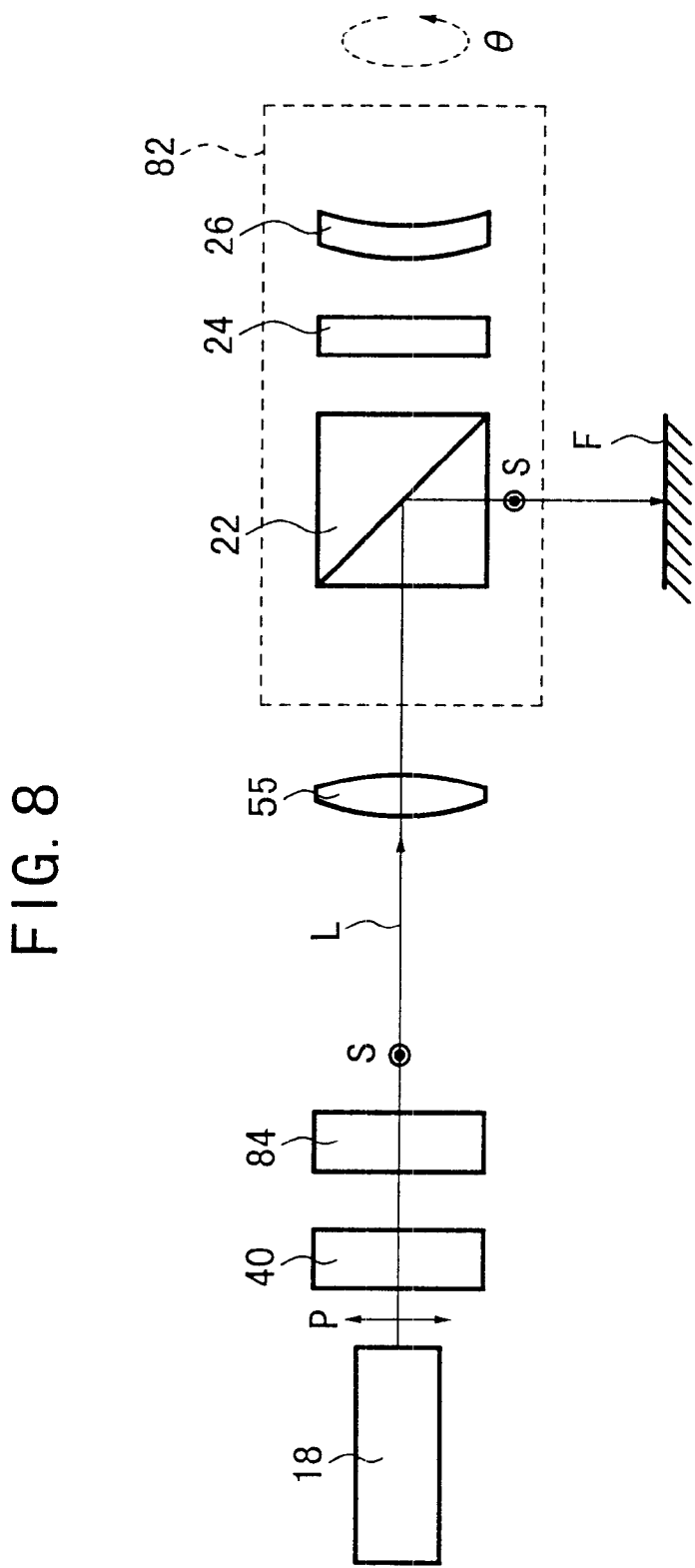
FIG. 8 is a schematic view showing the manner in which an internal-surface-scanning image recording apparatus according to another embodiment of the present invention operates to record an image.
Figure 9:
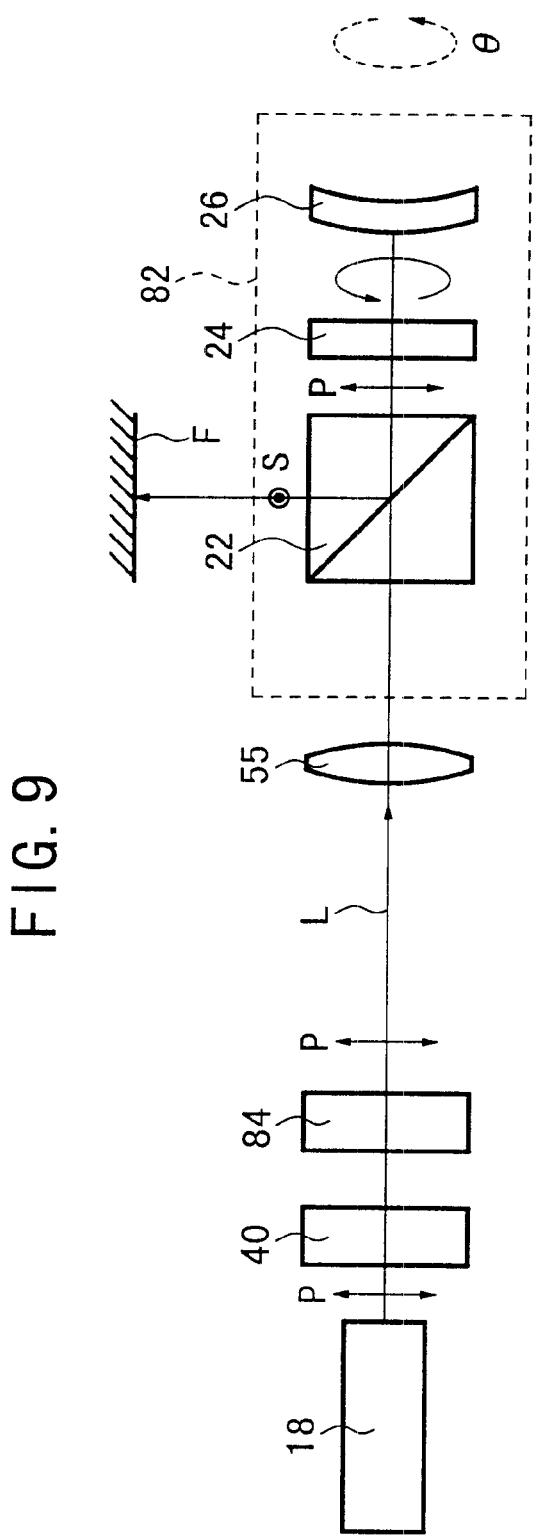
FIG. 9 is a schematic view showing the manner in which the internal-surface-scanning image recording apparatus shown in FIG. 8 operates to record an image.
Figure 10:
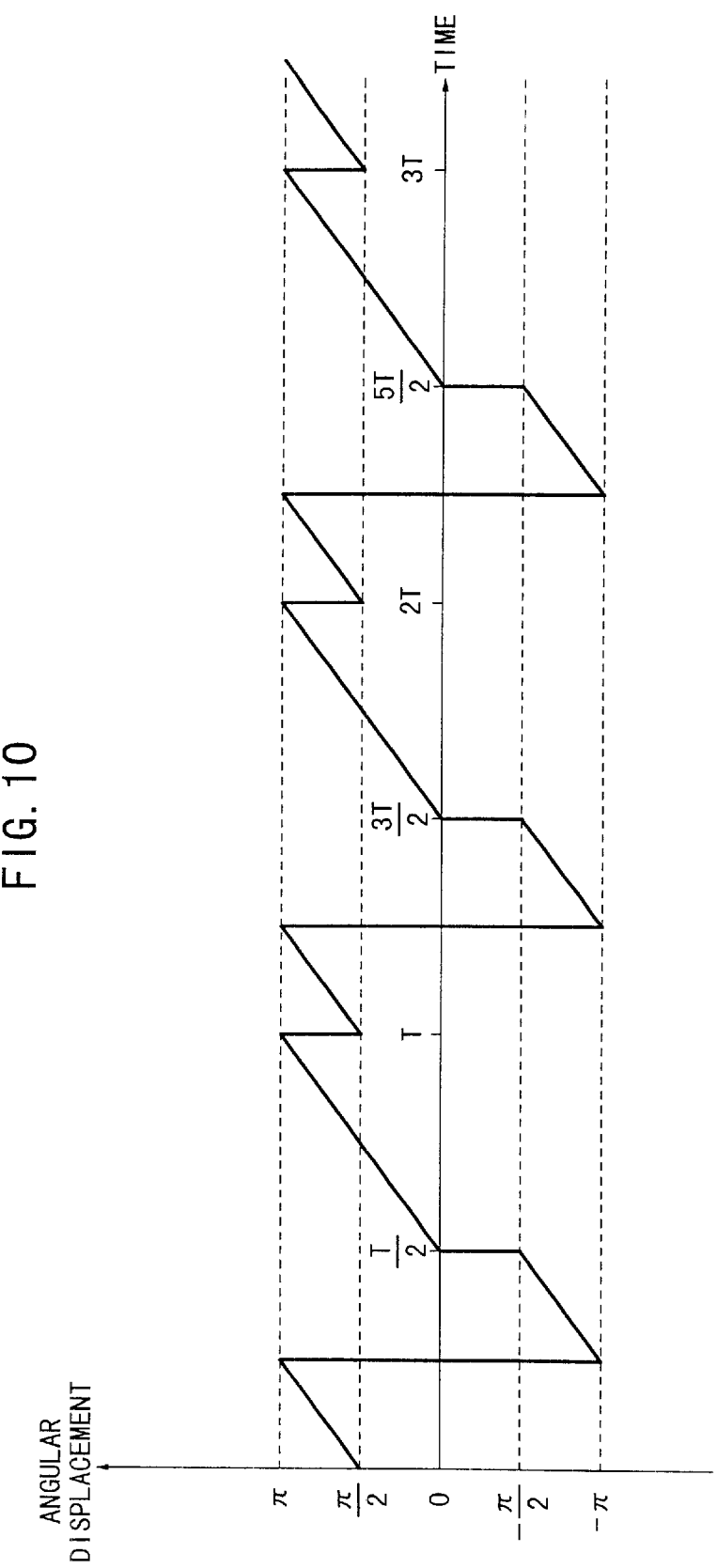
FIG. 10 is a diagram illustrative of the angular displacement of a plane of polarization by a polarization switcher in the internal-surface-scanning image recording apparatus shown in FIGS. 8 and 9.

FIGS. 8 and 9 show the manner in which an internal-surface-scanning image recording apparatus according to another embodiment of the present invention operates to record an image. The internal-surface-scanning image recording apparatus has a scanning optical system as shown in FIGS. 8 and 9, for rotating the plane of polarization of the laser beam L in synchronism with a rotatable unit 82 as shown in FIG. 10 for thereby recording a desired image efficiently on the recording medium F without an undue waste of laser beam energy.

Specifically, the rotatable unit 82 of a spinner comprises the polarization beam splitter 22, the quarter-wave plate 24, and the convex mirror 26, and a rotator 84 comprising a Faraday-effect device or the like is disposed downstream of the laser beam modulator 40.

While the rotatable unit 82 is being angularly moved from 0° to 180°, the rotator 84 rotates the plane of polarization of the p-polarized laser beam L modulated by the laser beam modulator 40 in ranges from $\pi/2$ to $\pi$ and from $-\pi$ to $-\pi/2$ in synchronism with the polarization beam splitter 22, and supplies an s-polarized laser beam L via the condensing lens 55 to the polarization beam splitter 22. The polarization beam splitter 22 reflects the s-polarized laser beam L substantially in its entirety toward the recording medium F (see FIG. 8).

While the rotatable unit 82 is being angularly moved from 180° to 360°, the rotator 84 rotates the plane of polarization of the p-polarized laser beam L in a range from 0 to $\pi$, and supplies the p-polarized laser beam L via the condensing lens 55 to the polarization beam splitter 22. The polarization beam splitter 22 passes the p-polarized laser beam L to the convex mirror 26 via the quarter-wave plate 24. The p-polarized laser beam L that has passed through the quarter-wave plate 24 is converted into a circularly polarized laser beam L, which is thereafter reflected by the convex mirror 26 back toward the quarter-wave plate 24. The quarter-wave plate 24 converts the circularly polarized laser beam L into an s-polarized laser beam L. The s-polarized laser beam L is reflected substantially in its entirety by the polarization beam splitter 22, and applied to the recording medium F (see FIG. 9).

Figure 11:
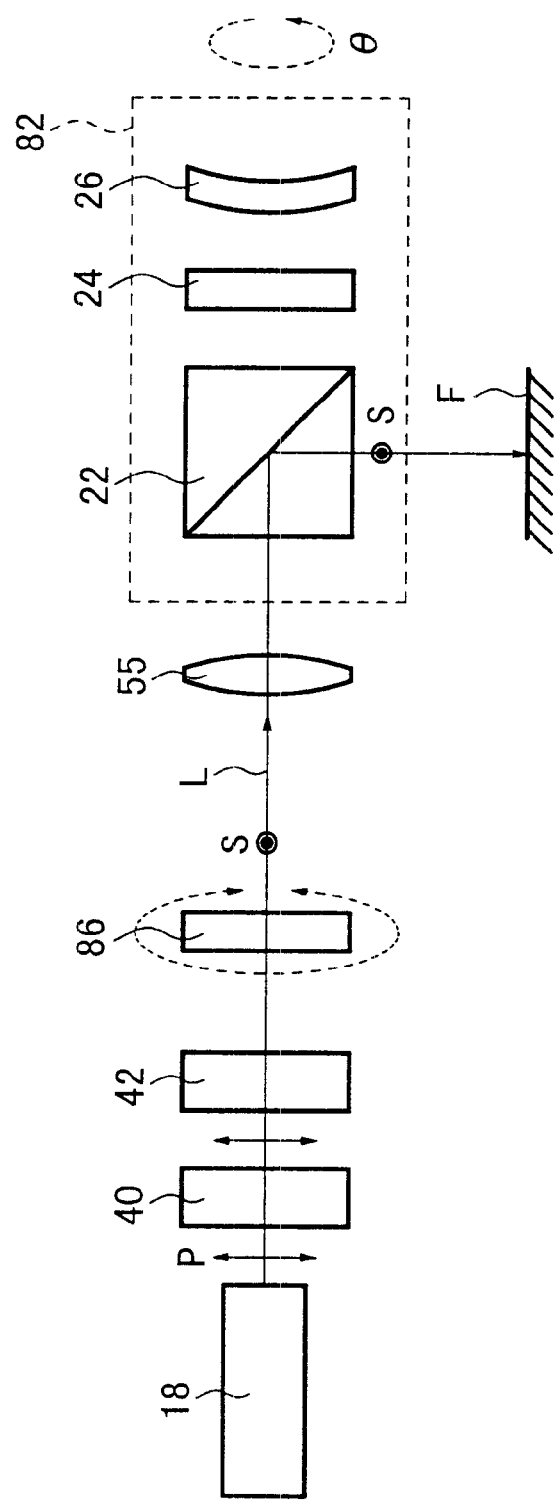
FIG. 11 is a schematic view showing the manner in which an internal-surface-scanning image recording apparatus according to still another embodiment of the present invention operates to record an image.
Figure 12:
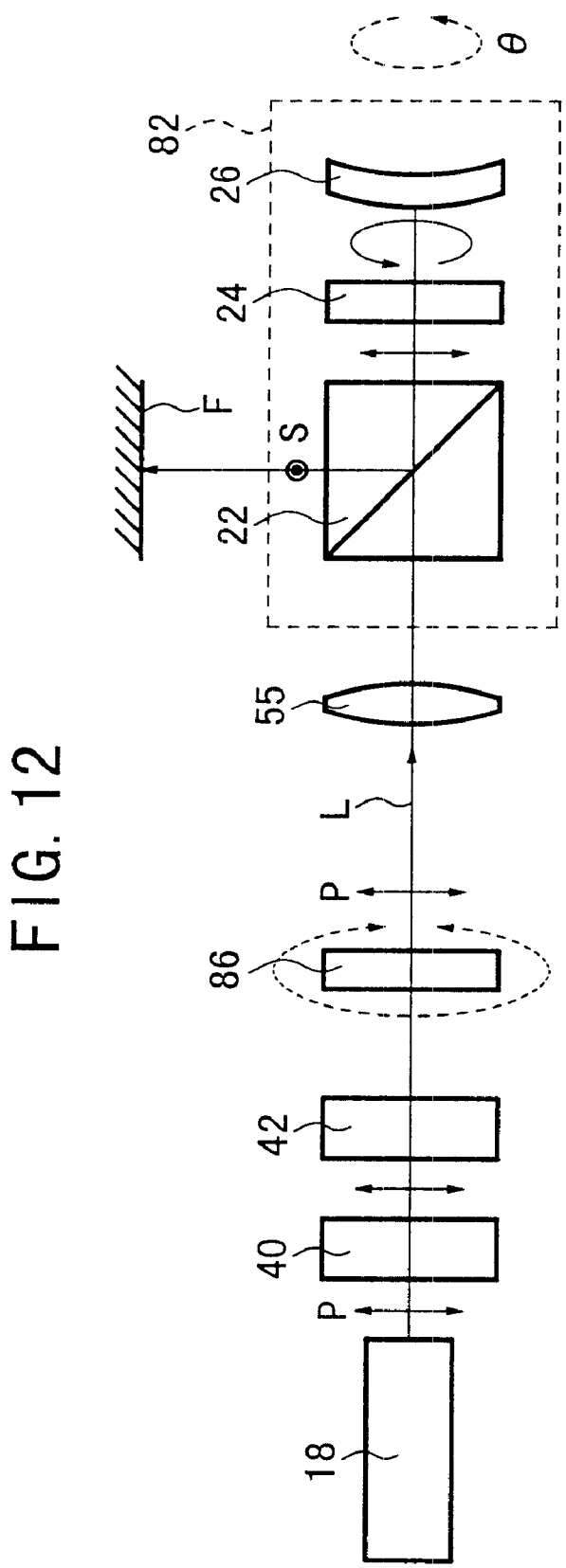
FIG. 12 is a schematic view showing the manner in which the internal-surface-scanning image recording apparatus shown in FIG. 11 operates to record an image.
Figure 13:
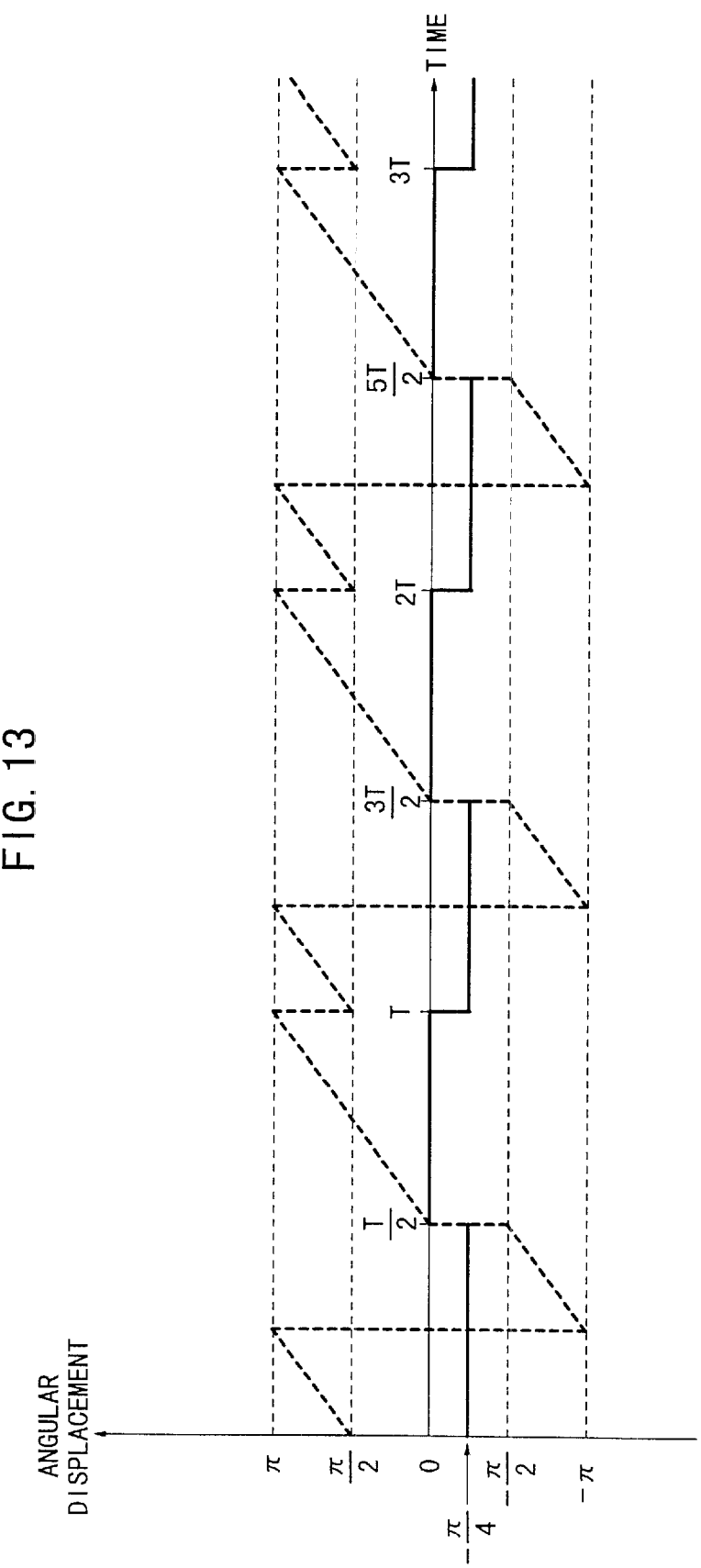
FIG. 13 is a diagram illustrative of the angular displacement of a plane of polarization by a polarization switcher in the internal-surface-scanning image recording apparatus shown in FIGS. 11 and 12.

FIGS. 11 and 12 show the manner in which an internal-surface-scanning image recording apparatus according to still another embodiment of the present invention operates to record an image. The internal-surface-scanning image recording apparatus has a scanning optical system as shown in FIGS. 11 and 12, for changing the plane of polarization of the laser beam L with the polarization switcher 42 in synchronism with the rotatable unit 82 as indicated by the solid-line curve in FIG. 13 and thereafter rotating a half-wave plate 86 disposed downstream of the polarization switcher 42 as indicated by the dotted-line curve in FIG. 13, for thereby recording a desired image efficiently on the recording medium F without an undue waste of laser beam energy.

Specifically, while the rotatable unit 82 is being angularly moved from 0 to 180°, the polarization switcher 42 rotates the plane of polarization of the p-polarized laser beam L through 45° ($-\pi/4$), and supplies the p-polarized laser beam L to the half-wave plate 86. Since the half-wave plate 86 rotates the plane of polarization of the laser beam L through 90°, it outputs the laser beam L as an s-polarized laser beam L. The half-wave plate 86 rotates in ranges from $\lambda/2$ to $\pi$ and from $-\pi$ to $-\pi/2$ in synchronism with the rotatable unit 82 for thereby rotating the plane of polarization of the laser beam L, and supplies an s-polarized laser beam L via the condensing lens 55 to the polarization beam splitter 22. The polarization beam splitter 22 reflects the s-polarized laser beam L substantially in its entirety toward the recording medium F (see FIG. 11).

While the rotatable unit 82 is being angularly moved from 180° to 360°, the polarization switcher 42 supplies the p-polarized laser beam L as it is to the half-wave plate 86. The half-wave plate 86 which is supplied with the p-polarized laser beam L rotates in a range from 0 to $\pi$ in synchronism with the rotatable unit 82, and supplies the p-polarized laser beam L via the condensing lens 55 to the polarization beam splitter 22. The polarization beam splitter 22 passes the p-polarized laser beam L to the convex mirror 26 via the quarter-wave plate 24. The p-polarized laser beam L that has passed through the quarter-wave plate 24 is converted into a circularly polarized laser beam L, which is thereafter reflected by the convex mirror 26 back toward the quarter-wave plate 24. The quarter-wave plate 24 converts the circularly polarized laser beam L into an s-polarized laser beam L. The s-polarized laser beam L is reflected substantially in its entirety by the polarization beam splitter 22, and applied to the recording medium F (see FIG. 12).

Figure 14:
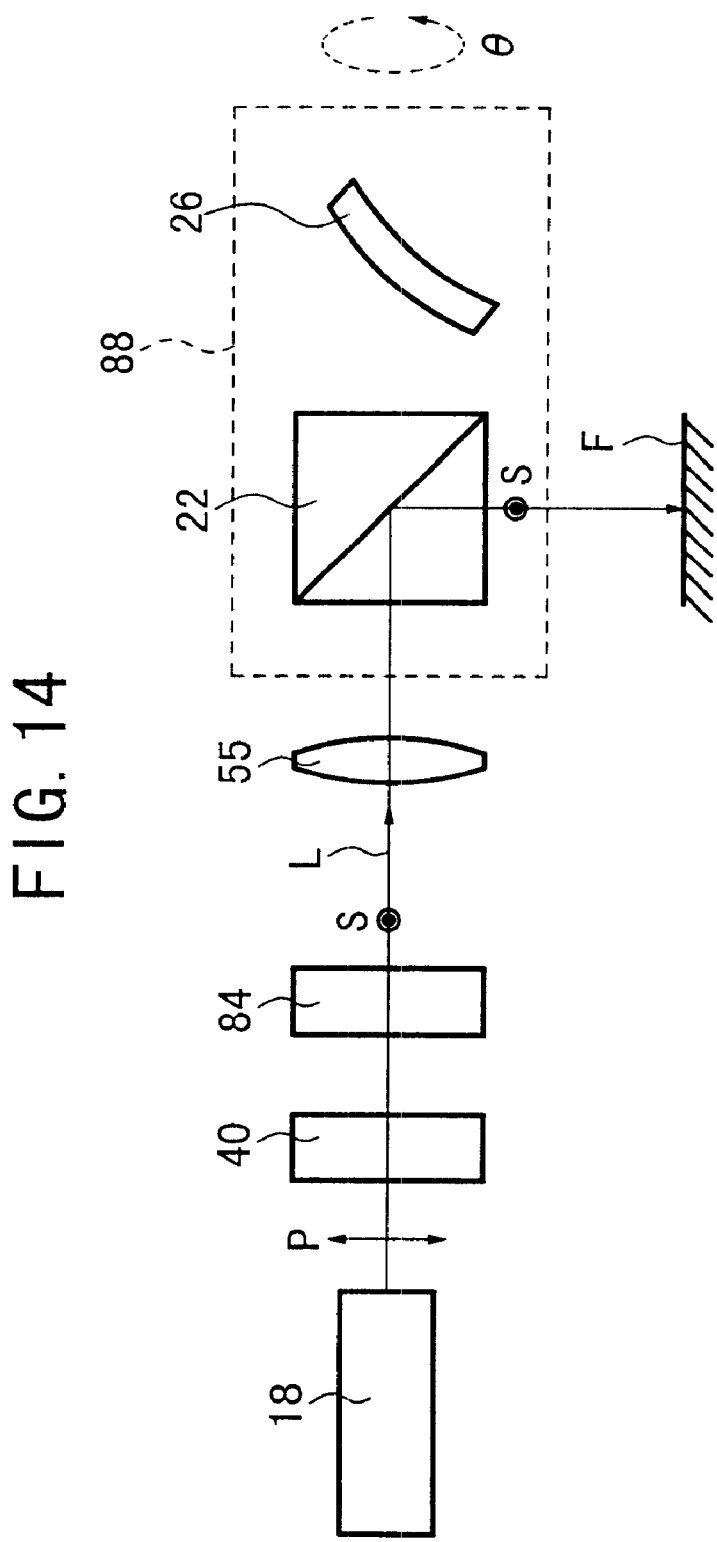
FIG. 14 is a schematic view showing the manner in which an internal-surface-scanning image recording apparatus according to yet another embodiment of the present invention operates to record an image.
Figure 15:
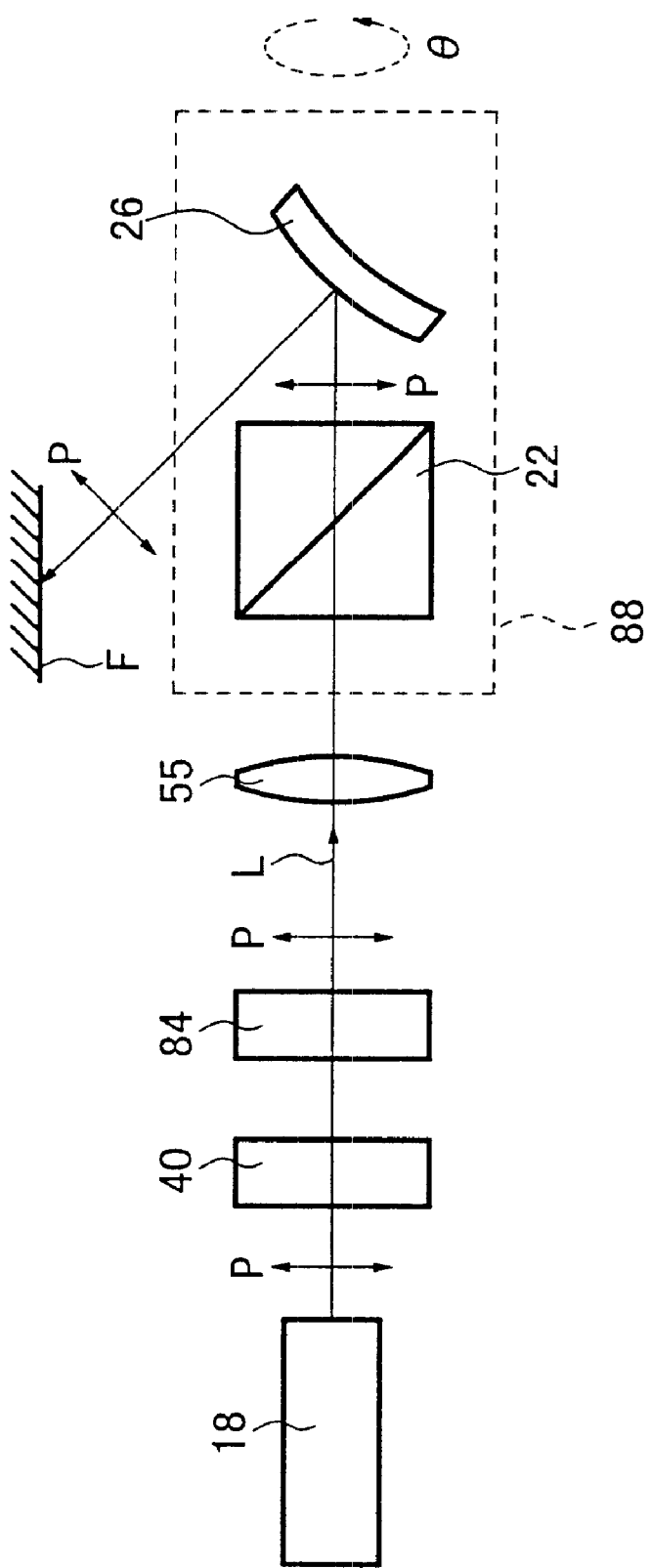
FIG. 15 is a schematic view showing the manner in which the internal-surface-scanning image recording apparatus shown in FIG. 14 operates to record an image.

FIGS. 14 and 15 show the manner in which an internal-surface-scanning image recording apparatus according to yet another embodiment of the present invention operates to record an image. As shown in FIG. 14 and 15, the internal-surface-scanning image recording apparatus has a rotatable unit 88 comprising the polarization beam splitter 22 and the convex mirror 26. The rotator 84 is disposed downstream of the laser beam modulator 40.

While the rotatable unit 88 is being angularly moved from 0° to 180°, the rotator 84 rotates the plane of polarization of the p-polarized laser beam L in synchronism with the rotatable unit 88, and supplies an s-polarized laser beam L via the condensing lens 55 to the polarization beam splitter 22. The polarization beam splitter 22 reflects the s-polarized laser beam L substantially in its entirety toward the recording medium F (see FIG. 14).

While the rotatable unit 88 is being angularly moved from 180° to 360°, the rotator 84 rotates the plane of polarization of the p-polarized laser beam L so as to supply the p-polarized laser beam L via the condensing lens 55 to the polarization beam splitter 22. After having passed through the polarization beam splitter 22, the p-polarized laser beam L is reflected by the convex mirror 26 and focused onto the recording medium F (see FIG. 15).

The arrangement shown in FIGS. 14 and 15 is advantageous in that it has a minimum number of rotating optical components.

Figure 16:
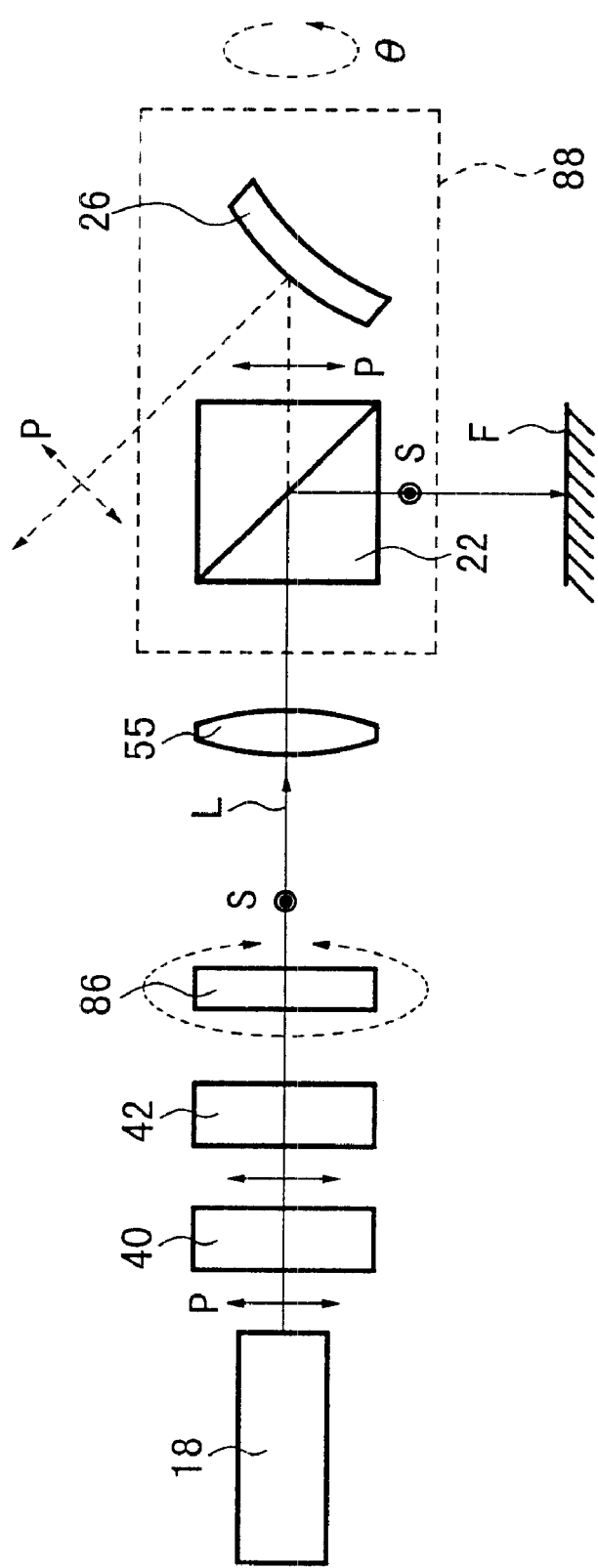
FIG. 16 is a schematic view showing the manner in which an internal-surface-scanning image recording apparatus according to yet still another embodiment of the present invention operates to record an image.

FIG. 16 shows the manner in which an internal-surface-scanning image recording apparatus according to yet still another embodiment of the present invention operates to record an image. As shown in FIG. 16, the internal-surface-scanning image recording apparatus has the same rotatable unit 88 as the rotatable unit 88 of the internal-surface-scanning image recording apparatus shown in FIGS. 14 and 15. In addition, the polarization switcher 42 and the half-wave plate 86 are disposed downstream of the laser beam modulator 40. The polarization switcher 42, the half-wave plate 86, and the rotatable unit 88 are controlled in the same manner with the internal-surface-scanning image recording apparatus shown in FIGS. 11 and 12.

Figure 17:
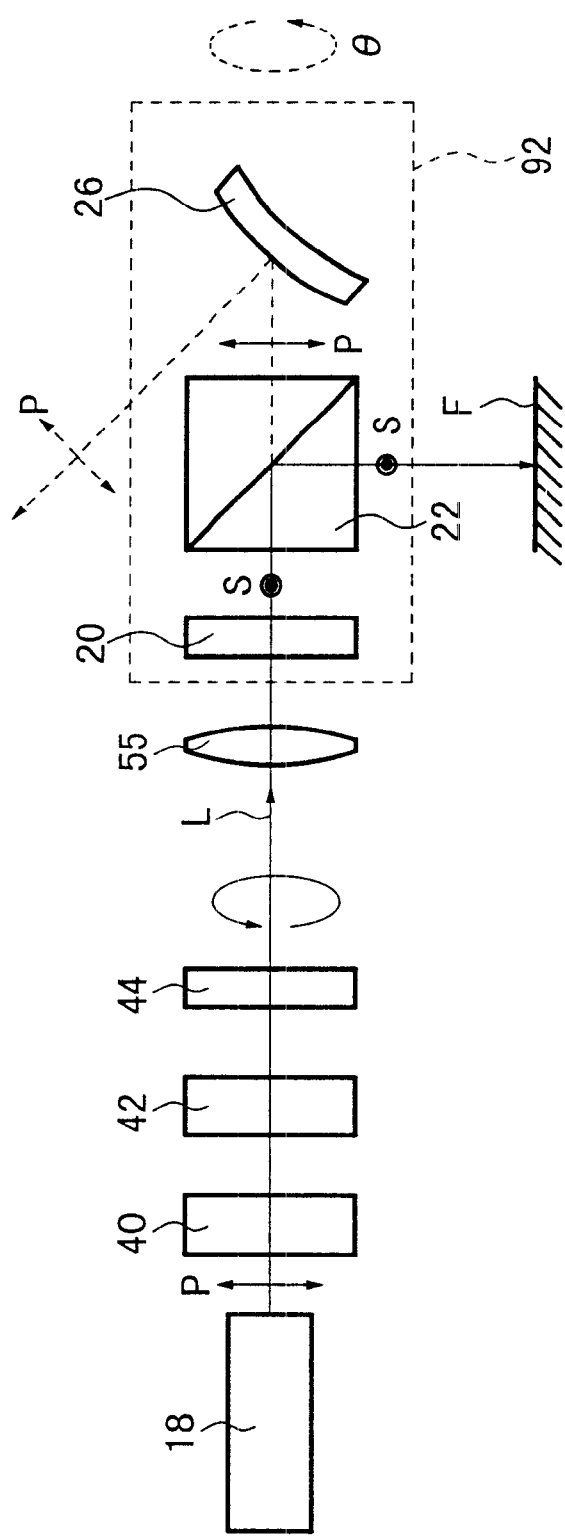
FIG. 17 is a schematic view showing the manner in which an internal-surface-scanning image recording apparatus according to a further embodiment of the present invention operates to record an image.
Figure 18:
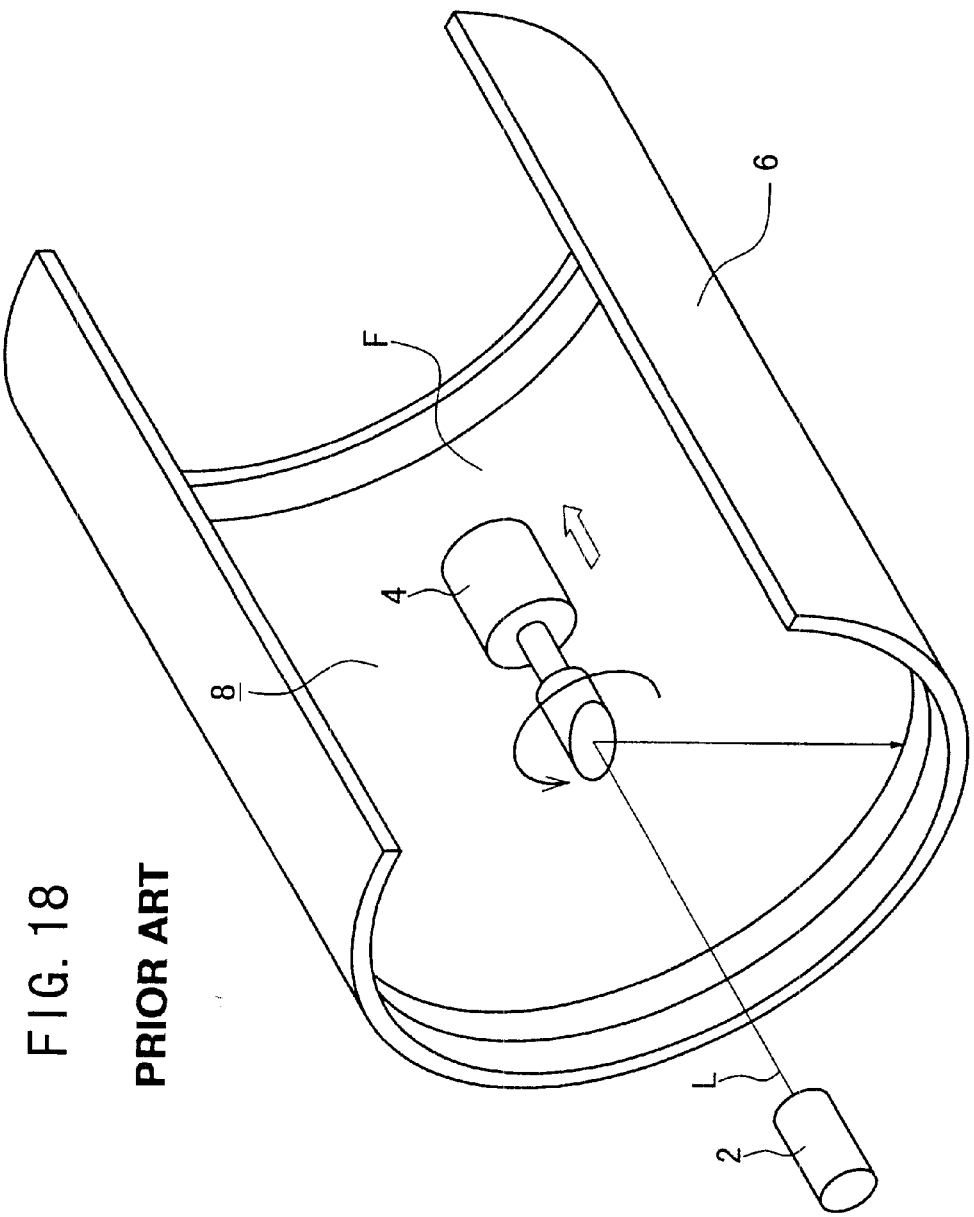
FIG. 18 is a perspective view of a conventional internal-surface-scanning image recording apparatus.

FIG. 17 shows the manner in which an internal-surface-scanning image recording apparatus according to a further embodiment of the present invention operates to record an image. As shown in FIG. 17, the internal-surface-scanning image recording apparatus has a rotatable unit 92 comprising the quarter-wave plate 20, the polarization beam splitter 22, and the convex mirror 26. The polarization switcher 42 and the quarter-wave plate 44 are disposed downstream of the laser beam modulator 40. The polarization switcher 42, the quarter-wave plate 44, and the rotatable unit 92 are controlled in substantially the same manner as with the internal-surface-scanning image recording apparatus shown in FIGS. 4 and 5.

In each of the above embodiments, the convex mirror 26 of the spinner 14 may be replaced with a combination of a concave lens and a plane mirror. Furthermore, instead of the condensing lens 55 positioned upstream of the polarization beam splitter 22, a plurality of condensing lenses having predetermined focal lengths may be disposed downstream of the polarization beam splitter 22. For example, in the internal-surface-scanning image recording apparatus shown in FIG. 17, the s-polarized laser beam L reflected by the polarization beam splitter 22 may be focused onto the recording medium F by a first condensing lens, and the p-polarized laser beam L transmitted through the polarization beam splitter 22 may be focused onto the recording medium F by a second condensing lens whose focal length is different from the focal length of the first condensing lens. With the focal length of the second condensing lens being suitably selected, the convex lens 26 may be replaced with a plane mirror.

Although certain preferred embodiments of the present invention have been shown and described in detail, it should be understood that various changes and modifications may be made therein without departing from the scope of the appended claims.

What is claimed is:
1. An internal-surface-scanning image recording apparatus for applying a modulated light beam to a recording medium to record an image thereon, comprising:
a semicylindrical member for supporting the recording medium on an inner circumferential surface thereof;

a light source for emitting the light beam;

a polarization beam splitter rotatable about a central axis of said semicylindrical member, for reflecting a first polarized light beam emitted from said light source toward the recording medium and transmitting a second polarized light beam whose direction of polarization is perpendicular to the direction of polarization of said first polarized light beam;

polarized light guiding means for guiding the second polarized light beam transmitted through said polarization beam splitter toward the recording medium without passing back to said polarized beam splitter; and polarization control means for controlling the direction of polarization of said light beam depending on an angular displacement of said polarization beam splitter.

2. An internal-surface-scanning image recording apparatus according to claim 1, wherein said light source comprises a laser beam generator for emitting a laser beam.

3. An internal-surface-scanning image recording apparatus according to claim 1, wherein said polarization control means comprises:

a polarization switcher for converting said light beam into one of two linearly polarized light beams whose directions of polarization are perpendicular to each other;

a first quarter-wave plate for converting said one of the two linearly polarized light beams into a circularly polarized light beam; and a second quarter-wave plate rotatable with said polarization beam splitter, for converting said circularly polarized light beam into a linearly polarized light beam and guiding said linearly polarized light beam toward said polarization beam splitter.

4. An internal-surface-scanning image recording apparatus according to claim 3, wherein said polarization switcher comprises an electro-optic deflector.

5. An internal-surface-scanning image recording apparatus according to claim 1, wherein said polarization control means comprises:

a rotator for rotating the direction of polarization of said light beam in synchronism with said polarization beam splitter.

6. An internal-surface-scanning image recording apparatus according to claim 5, wherein said rotator comprises a Faraday-effect device.

7. An internal-surface-scanning image recording apparatus according to claim 1, wherein said polarization control means comprises:

a polarization switcher for converting said light beam into one of two linearly polarized light beams whose directions of polarization are angularly spaced from each other by 45°; and a half-wave plate for rotating the direction of polarization of said one of the two linearly polarized light beams in synchronism with said polarization beam splitter.

8. An internal-surface-scanning image recording apparatus according to claim 7, wherein said polarization switcher comprises an electro-optic deflector.

9. An internal-surface-scanning image recording apparatus according to claim 1, wherein said polarized light guiding means comprises:

a reflecting plate for reflecting said second polarized light beam toward said recording medium.

10. An internal-surface-scanning image recording apparatus according to claim 1, wherein said polarized light guiding means comprises:

a reflecting plate rotatable with said polarization beam splitter, for reflecting and focusing said light beam transmitted through said polarization beam splitter onto said recording medium.

* * * * *